(12) United States Patent
McKernan et al.

(10) Patent No.: US 8,916,257 B1
(45) Date of Patent: Dec. 23, 2014

(54) CLOTH-LIKE SYNTHETIC TEXTILES

(75) Inventors: Peter McKernan, Dover, PA (US); Don Kauffman, Lancaster, PA (US); Larry Rinehart, Dover, PA (US); Lititia Carter, York, PA (US); Ralph Todd, York, PA (US)

(73) Assignee: Aberdeen Road Company, Emigsville, PA (US)

( * ) Notice: Subject to any disclaimer, the term of this patent is extended or adjusted under 35 U.S.C. 154(b) by 1112 days.

(21) Appl. No.: 11/967,811

(22) Filed: Dec. 31, 2007

Related U.S. Application Data

(60) Provisional application No. 60/882,782, filed on Dec. 29, 2006.

(51) Int. Cl.
*B32B 3/00* (2006.01)
*D06N 3/00* (2006.01)
*B29C 59/04* (2006.01)

(52) U.S. Cl.
USPC ........ 428/172; 428/151; 428/904; 428/904.4; 264/241; 264/257; 156/209

(58) Field of Classification Search
USPC ................ 428/42.1, 105, 114, 151, 172, 354, 428/423.4, 540, 542.2, 904, 904.4; 264/241, 257; 156/209
See application file for complete search history.

(56) References Cited

U.S. PATENT DOCUMENTS

| | | | | | |
|---|---|---|---|---|---|
| 2,033,099 | A | * | 3/1936 | Hanley et al. | 427/373 |
| 4,211,806 | A | * | 7/1980 | Civardi et al. | 428/91 |
| 4,349,597 | A | * | 9/1982 | Fine et al. | 428/95 |
| 5,707,710 | A | * | 1/1998 | Zafiroglu | 428/151 |
| 2006/0270298 | A1 | | 11/2006 | Kuhn et al. | |

* cited by examiner

*Primary Examiner* — Donald J Loney
(74) *Attorney, Agent, or Firm* — Sughrue Mion, PLLC

(57) ABSTRACT

An embossing and texturizing system capable of imparting a natural cloth-like surface to a flexible thermoplastic material or film simultaneously to either or both of its two exterior surfaces, through the use of a unique device and technique combining metal rolls, metal and rubber rolls, and embossing and texturizing fabric rolls into an embossing system creating the desired visual and tactile feel of natural fabrics as well as additional performance characteristics. The embossing and texturizing system embosses and texturizes the exterior surface of the flexible thermoplastic material or film by selectively altering the exterior surface, and therefore, the film can be embossed simultaneously on either or both of its two exterior surfaces (face and reverse) without necessitating major interruption or adjustment of the system. The use of the embossing and texturizing mechanism and its alignment to the core and stabilizing reinforcing substrate enables the exterior texturized surface and the bottom side exterior texturized surface to be identical in all manner.

36 Claims, 1 Drawing Sheet

REVERSE SIDE of LAMINATOR/COATER       FACE SIDE of LAMINATOR/COATER

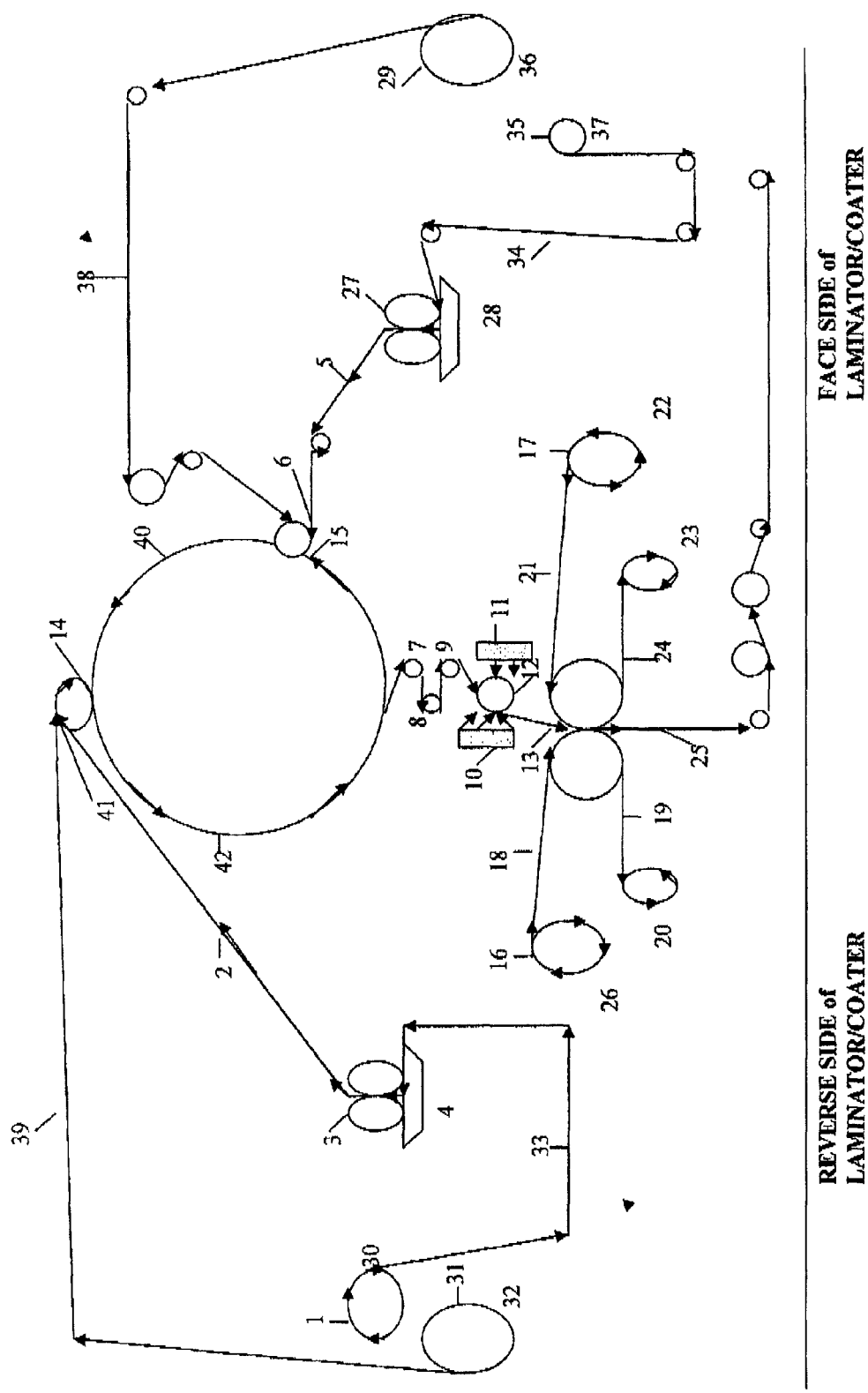

CLOTH-LIKE SYNTHETIC TEXTILES

RELATED APPLICATIONS

This application claims benefit from U.S. Provisional Application No. 60/882,782, filed Dec. 29, 2007, hereby incorporated by reference in its entirety.

BACKGROUND OF THE INVENTION

1. Field of the Invention

The invention is related to the embossing of flexible thermoplastic reinforced composites and their manufacture. The invention is related particularly to fabrics used for tents, awning, casual furniture, signage, automotive, healthcare, and the like where the look and feel of natural cloth-like fabrics is desirable.

2. Description of the Related Art

The majority of the synthetic fabrics that attempt to imitate natural cloth-like characteristics that are used by businesses in the marketplace are dyed acrylic fabric, polyvinyl chloride or other thermoplastic compounds. The weakness of the dyed acrylic fabrics is that they lack adequate flame resistance, water proofness and other characteristics typically attributed to thermoplastics polymers such as polyvinyl chloride, polyurethane, polyethylene, polypropylene and other similar polymers. However, these other thermoplastic polymers lack the aesthetic look and feel of woven dyed acrylic and natural cloth fabrics because they can only be texturized on one side (face) of the composite. Alternatively, a print pattern may also be used on one or both sides of the composite to imitate natural cloth-like fabric. In all cases, such resurfacing in an attempt to create the illusion of embossing and texturizing, without actually creating the surface embossing and texturizing, inadequately mimics the natural woven product.

Historically, industry has achieved the characteristics and aesthetics of natural cloth-like fabrics by one of three mechanisms:

(1) Traditional weaving of natural or synthetic yarns which also may be dyed or coated with a thermoplastic polymer.

(2) Use of a metal embossing cylinder to emboss and texturize the surface of a thermoplastic material to create a surface on one of the synthetic flexible thermoplastic material surfaces to attempt to imitate the appearance of a natural cloth-like fabric.

(3) Use of a metal embossing cylinder to empress and texturize the surfaces of a thermoplastic material to create a surface on the face side of the flexible synthetic thermoplastic material surfaces and the use of a printed thermoplastic material on the reverse side to imitate the face side embossed texturized surface to attempt to imitate the appearance of a natural cloth-like fabric.

The above-described processes suffer from one or more of the following limitations. When a process is employed to mimic natural cloth like appearance, the process fails to provide the desirable additional characteristics including but not limited to high flame resistance, water-proof, mildew and fungal resistance, stability when exposed to ultraviolet light, color fastness, strong, light weight, conformable, dimensionally stable, and suitable for sewing welding and fabrication by various means common in industry. When a process is employed to provide the desirable characteristics of including but not limited to high flame resistance, water-proof, mildew and fungal resistance, stability when exposed to ultraviolet light, color fastness, strong, light weight, conformable, dimensionally stable, and suitable for sewing welding and fabrication by various means common in industry, the process fails to provide the natural cloth-like appearance. In both cases, the resulting product suffers in either un-natural appearance or inadequate performance. An additional limitation is that this undesirable one-sided product has limited useful application due to complications and utility arising from the dissimilar nature of the face to reverse surfaces.

SUMMARY OF THE INVENTION

It is therefore an object of the invention to provide an embossed and texturized thermoplastic composite that looks like fabric and has weather resistance, flame resistance, water-proofness, mildew and fungal resistance, stability when exposed to ultraviolet light and color fastness and is strong, light weight, conformable and dimensionally stable, and is suitable for sewing, welding and fabrication by various means common in industry.

The above objects have been achieved by providing an embossed and textured flexible thermoplastic composite having a flexible thermoplastic top layer (a) having a textured exterior face side and an interior reverse side, a multi-phase adhesive layer (b), a core reinforcing layer (c) having a face and reverse side, a multi-phase adhesive layer (d) and an embossed and textured flexible thermoplastic bottom layer (e) having a textured exterior face side and an interior reverse side. Further, the reverse side of the top layer (a) is preferably adhered, bonded and anchored to the core reinforcing layer (c) by means of the multi-phase adhesive layer (b), and the reverse side of the bottom layer (e) is preferably adhered, bonded and anchored to the (c) core reinforcing layer by means of the multi-phase adhesive layer (d).

In more detail, the embossed and texturized thermoplastic composite according to the present invention is achieved by using a unique and novel embossing and texturizing system and methodology capable of simultaneously imparting a natural cloth-like surface to a flexible thermoplastic material or film on either or both of its two exterior surfaces through the use of a unique device and technique combining a series of rolls (selected from metal rolls and rubber rolls, or a combination thereof, that are known and used in industry) and embossing and texturizing fabric rolls into a unique and novel embossing system. The unique embossing system creates the desired visual and tactile feel of natural fabrics as well as additional desirable performance characteristics including but not limited to weather resistance, flame resistance, waterproof, mildew and fungal resistance, stability when exposed to ultraviolet light, color fastness, strong, light weight, conformable, dimensionally stable, and suitable for sewing, welding and fabrication.

The embossing system comprising a series of rolls and embossing and texturizing fabric rolls are situated to function as a single embossing and texturizing mechanism with their axes positioned horizontally and perpendicular to the lengthwise direction of the machine. This unique embossing and texturizing system embosses and texturizes the exterior surface of the flexible thermoplastic material or film by selectively altering the exterior surface, and therefore, the film can be embossed simultaneously on either or both of its two exterior surfaces (face and reverse) without necessitating major interruption or adjustment of the system.

The use of a multi-phase adhesive system achieves an optimum amount of interfacial adhesion, bonding and anchoring among and between the layers of the composite. The use of the unique embossing and texturizing mechanism and its alignment in relationship to the core stabilizing layer (e.g., a reinforcing fabric substrate) enables the exterior texturized surface and the bottom side exterior texturized surface to be identical in all manner. Further, to achieve the objects of the invention the top and bottom layer are not particularly limited and can be comprised of any flexible thermoplastic material that can be coated, laminated or extruded to or through the core reinforcing layer.

The resulting thermoplastic composite simulates natural cloth-like fabrics in appearance and feel, such that the embossed and texturized thermoplastic composite of the invention is indistinguishable from other forms of natural cloth.

The embossed and texturized thermoplastic composite is a composite containing a flexible thermoplastic top layer having an embossed face side, a reinforcing layer and a flexible thermoplastic bottom layer having an embossed side. Further, the composite contains a multi-phase adhesive system applied to the inside of the top thermoplastic layer and the inside of the bottom thermoplastic layer in such a manner as to optimize the interfacial bonding, adhesion and anchoring of the entire composite. The multi-phase adhesive bonds all the layers forming a single thermoplastic composite. Additionally, the top layer and bottom layer can be coated independently with a polymer to impart desirable characteristics, including but not limited to resistance to weathering, fire, staining, plasticizer migration and color fading.

Example of thermoplastic materials that are capable of accepting this unique process of embossing and texturizing include but are not limited to polyvinyl chloride, polyurethane, polyester polyamide, halogenated polyolefin, hydrogenated polyisoprene, hydrogenated polybutadiene, hydrogenated ethylene polybutadiene, hydrogenated polyisoprene, hydrogenated polybutadiene, hydrogenated ethylene polybutadiene, hydrogenated styrene, ethylene polybutadiene block copolymers, certain flexible grades of polyolefin, EVA, EVOH, certain grades of thermoplastic block copolymers, polycaprolatones, polyacrylates and the like compounds or blends thereof.

The core reinforcing layer (substrate) is typically a reinforced fabric preferably comprised of polyester yarn, polyamide yarn, polyimide yarn, polyethylene yarn, acrylic yarn, glass yarn, aramid yarn, cotton yarn, and blends thereof, where the yarn is selected to impart the desired degree of reinforcement, flexibility and stability. The fabric layer is embedded in the composite layers and its alignment with respect to the embossing system fabric achieves the exterior embossed and texturized appearance of the composite.

The multi-phase adhesive, which during the processing is converted into a continuous film by application of heat, is engineered to achieve the optimum amount of interfacial adhesion, bonding and anchoring among and between the layers of the composite.

The embossing and texturizing fabric of the embossing and texturizing rolls is typically a reinforced fabric layer, preferably comprised of a polyester yarn, a polyamide yarn, a polyimide yarn, a polyethylene yarn, an acrylic yarn, a glass yarn, an aramid yarn, a cotton yarn, and blends thereof. The yarn may be selected to impart the desired degree of reinforcement, flexibility and stability.

The embossing and texturizing fabric is not a part of the final thermoplastic composite. However, the embossing system fabric layer, its selection, and alignment with other components of the embossing and texturizing system, and its alignment with the core reinforcing layer, which does remain an integral part of the finished thermoplastic composite, achieves the desired natural cloth-like surface on both the top exterior surface and the bottom exterior surface.

BRIEF DESCRIPTION OF THE DRAWING

The invention will be explained in more detail below with reference to exemplary embodiments in connection with the drawing. However, the present invention should not be construed as being limited thereto. All percentages (%) are given in terms of weight unless otherwise specified.

The drawing is a block diagram of an embossing and texturizing system according to a first and second embodiment of the invention described below.

The reference characters shown in the drawing represent the following:
1. Reverse thermoplastic film
2. Reverse lamination/coating & adhesive threading web paths
3. Reverse adhesive
4. Reverse adhesive station
5. Face lamination/coating & adhesive threading web path
6. Face thermoplastic film & fabric reinforcing substrate lamination/coating point
7. Heated roll
8. Heated roll
9. Heated roll
10. Heat lamp
11. Heat lamp
12. Heated roll
13. Lamination/coating entrance embossing and texturizing station
14. Reverse lamination/coating drum laminate/coating point
15. Face lamination/coating drum laminate/coating point
16. Reverse embossing and texturizing fabric rolls
17. Face embossing and texturizing fabric rolls
18. Face embossing and texturizing fabric threading web path
19. Reverse embossing and texturizing fabric exit threading web path
20. Face embossing and texturizing exit rewind station
21. Reverse exit embossing and texturizing fabric threading web path
22. Face embossing and texturizing fabric entrance threading web path
23. Face embossing and texturizing fabric station
24. Face embossing and texturizing exit threading web path
25. Finished embossed & texturized laminated/coated composite identical both sides
26. Face exit embossing and texturizing fabric exiting threading web path
27. Face adhesive
28. Face adhesive station
29. Core reinforcing fabric substrate
30. Reverse thermoplastic film station
31. Core reinforcing fabric substrate
32. Core reinforcing fabric substrate station
33. Reverse lamination/coating thermoplastic film threading web path
34. Face lamination/coating thermoplastic film threading web path
35. Face thermoplastic film
36. Core reinforcing fabric substrate station
37. Face thermoplastic film station
38. Face lamination/coating substrate reinforcing fabric threading web path
39. Reverse lamination/coating substrate reinforcing fabric threading web path
40. Counter rotating lamination/coating drum path
41. Reverse thermoplastic film & fabric lamination/coating point
42. Counter rotating lamination/coating drum path

DETAILED DESCRIPTION OF THE INVENTION

The invention is an embossed and textured flexible thermoplastic composite formed by an embossing and texturizing system and methodology capable of simultaneously imparting a natural cloth-like surface to a flexible thermoplastic material or film on either or both of its two exterior surfaces, through the use of a unique device and technique combining a series of rolls (including metal rolls, rubber rolls, or a combination thereof) and embossing and texturizing fabric rolls into an embossing and texturizing system creating the desired visual and tactile feel of natural fabrics as well as additional desirable performance characteristics including but not limited to high flame resistance, water-proof, mildew and fungal resistance, stability when exposed to ultraviolet light, color fastness, strong, light weight, conformable, dimensionally stable, and suitable for sewing welding and fabrication by various means common in industry.

The embossed and textured thermoplastic composite is substantially comprised of a thermoplastic top layer having an embossed and texturized exterior face side with or without a topcoat, an adhesive layer, a core reinforcing layer, an adhesive layer, and a bottom layer of thermoplastic having an embossed and texturized exterior face side with or without a topcoat, in this order.

A first embodiment and a second embodiment according to the invention are described below using the drawing.

First Embodiment

The drawing shows an embossing and texturizing system that uses a synthetic embossing and texturizing fabric roll in conjunction with metal rolls, rubber rolls or combination thereof to create a unique and novel process, system and methodology for embossing and texturizing a thermoplastic multi-layered composite on one side according to a first embodiment of the invention.

The embossing and texturizing system shown in the drawing utilizes a synthetic embossing and texturizing fabric (17, 16); thermoplastic composite films (35, 1); adhesive (27, 3) and substrate reinforcing fabric (29, 31). These materials are processed from the face and reverse sides of the laminator/coater to produce a finished multi-layered embossed and texturized composite (25) achieved by the unique and novel embossing system.

On either side (face or reverse) of the laminator/coater the substrate reinforcing fabric (29, 31) is introduced from the corresponding substrate reinforcing fabric unwind station (36, 32) and threaded through the face or reverse substrate reinforcing fabric web path (38, 39) converging at the face or reverse thermoplastic composite and substrate reinforcing fabric lamination/coating point (15, 14). On the face and reverse sides of the laminator/coater the thermoplastic composite (35, 1) proceed from the face and reverse thermoplastic composite stations (37, 30) and is threaded through the face and reverse thermoplastic composite web paths (34, 33). The face and reverse thermoplastic composite follow the laminating/coating path through the face and reverse adhesive stations (28, 4) and are coated with adhesive on the face and reverse (27, 3). The adhesive coated thermoplastic composite follows the face and reverse thermoplastic composite and adhesive web paths (5, 2) converging with the face or reverse substrate reinforcing fabric (41, 6) at the face and reverse thermoplastic composite and substrate reinforcing fabric lamination/coating point (15, 14). The multiple layers of the laminate/coated composite proceed around the laminating/coating drum (40, 42), wrapping the heated rolls (7, 8, 9 & 12) and passing through heated face or reverse lamps (11, 10) to enter the lamination/coating, embossing and texturizing nip (13).

The embossing and texturizing fabric (17, 16) feeds from the face or reverse embossing fabric station (22, 26), following the designated web path (21, 18) to converge with the laminate/coated composite at the lamination/coating, embossing and texturizing nip (13). Full lamination/coating of the multiple layers and embossing and texturizing of the face thermoplastic surface are accomplished at this point. The laminate/coated, embossed and texturized composite then proceeds toward the rewind to be put up and packaged. The embossing and texturizing fabric (17, 16) follows return path (24, 19) and is rewound at station 23 or 20.

Second Embodiment

As noted above, the drawing shows an embossing and texturizing system that uses synthetic embossing and texturizing fabric rolls in conjunction with metal rolls, rubber rolls or a combination thereof to create a unique and novel process, system and methodology to emboss and texturize a thermoplastic multi-layered composite, face and reverse, according to a second embodiment of the invention.

The embossing system shown in the drawing utilizes embossing and texturizing fabric rolls (17, 16); thermoplastic composite films (35, 1); adhesive (27, 3) and substrate reinforcing fabric (29, 31). These materials are processed from the face and reverse sides of the laminator/coater to produce a finished multi-layered embossed composite (25) achieved by the unique and novel embossing system.

On either side (face or reverse) of the laminator/coater the substrate reinforcing fabric (29, 31) is introduced from the corresponding substrate reinforcing fabric unwind station (36, 32) and threaded through the face or reverse substrate reinforcing fabric web path (38, 39) converging at the face or reverse thermoplastic composite and substrate reinforcing fabric lamination/coating point (6, 41). On the face and reverse sides of the laminator/coater the thermoplastic composite (35, 1) proceed from the face and reverse thermoplastic composite stations (37, 30) and is threaded through the face and reverse thermoplastic composite web paths (34, 33). The face and reverse thermoplastic composite follow the laminating/cooling path through the face and reverse adhesive stations (28, 4) and are coated with adhesive on the face and reverse (27, 3). The adhesive-coated thermoplastic composite follows the face and reverse thermoplastic composite and adhesive web paths (5, 2) converging with the face or reverse substrate reinforcing fabric (29, 31) at the face and reverse thermoplastic composite and substrate reinforcing fabric lamination/coating point (15, 14). The multiple layers of the laminated/coated composite proceed around the laminating/coating drum path (40, 42), wrapping the heated rolls (7, 8, 9 and 12) and passing through heated face and reverse heat lamps (11, 10) to enter the lamination/coating embossing and texturizing nip (13).

The face and reverse embossing and texturizing fabrics (17, 16) simultaneously feed from the face and reverse embossing fabric stations (22, 26), following the designated web paths (21, 18) to converge with the laminated/coated composite at the lamination/coating embossing and texturizing nip (13). Full lamination/coating of the multiple layers and scrim-embossing of their thermoplastic surfaces are accomplished at this point.

The laminated/coated embossed and texturized composite then proceeds toward the rewind to be put up and packaged. The face and reverse embossing fabrics (17, 16) follow return paths (24, 19) and are rewound at stations 22 and 20.

Embossed and Textured Flexible Thermoplastic Composite

As described above with respect to the drawing, the embossing and texturizing system of the present invention achieves, for example, an embossed and textured flexible thermoplastic composite having (a) a flexible thermoplastic top layer having a textured exterior face side and an interior reverse side, (b) a multi-phase adhesive layer, (c) a core reinforcing layer (e.g., a reinforcing fabric) having a face and reverse side, (d) a multi-phase adhesive layer and (e) an embossed and textured flexible thermoplastic bottom layer having a textured exterior face side and an interior reverse side. The reverse side of the top layer (a) is attached to the core reinforcing layer (c) by means of the multi-phase adhesive layer (b), and the reverse side of the bottom layer (e) is attached to the (c) core reinforcing layer by means of the multi-phase adhesive layer (d). It is more preferable that the reverse side of the top layer (a) and the reverse side of the bottom layer (e) are adhered, bonded and anchored to the core reinforcing layer (c) by means of the multi-phase adhesive layers (b) and (d), respectively.

The embossed and texturized multi-layer composite preferably has a thickness of from 10-50 mils in thickness.

Flexible Thermoplastic Layers

The flexible thermoplastic top layer (a) and/or the flexible thermoplastic bottom layer (e) (the flexible thermoplastic layers) may be the same or different material. The flexible thermoplastic layers are preferably selected from, but are not limited to, polyvinyl chloride, polyurethane, polyester, polyamide, halogenated polyolefin, hydrogenated polyisoprene, hydrogenated polybutadiene, hydrogenated ethylene polybutadiene, hydrogenated styrene ethylene polybutadiene bloc copolymers, certain flexible grades of polyolefin, EVA, EVOH, certain grades of thermoplastic block copolymers, polycaprolatones and polyacrylates and the like, or blends thereof. The flexible thermoplastic layers may also be selected from multiple layers of polyvinyl chloride, vinyl chloride copolymer or vinyl chloride terpolymers in combination.

Top Coat

One or both of the flexible thermoplastic top layer (a) and/or the flexible thermoplastic bottom layer (e) (the flexible thermoplastic layers) may have a polymer top coat. The polymer top coat may be selected from materials that are resistant to exposure to ultra-violet light, weathering, staining, and plasticizer migration and degradation.

The polymer of the top coat preferably includes, but is not limited to, acrylic polymers, acrylic copolymers, acrylic terpolymers, methacrylic polymer, and methacrylic copolymers and methacrylic terpolymers, acrylonitrile polymers, acrylonitrile copolymers, acrylonitrile terpolymers, fluorinated polymers, fluorinated copolymers, fluorinated terpolymers, chlorofluoro polymers, chlorofluoro copolymers, chlorofluoro terpolymers, polyamide polymers, polyamide copolymers, polyamide terpolymers, aliphatic polymers, aliphatic copolymers, aliphatic terpolymers, urethane polymers, urethane copolymers and urethane terpolymers, or blends thereof. The polymer of the top coat may also include biodegradable, biocompostable and or non degradable, non compostable additives and components. The top coat may further comprise an agent to impart and enhance and further customize the surface finish.

Core Reinforcing Layer

The core reinforcing layer (substrate) may be comprised of a core reinforcing fabric that is comprised of, but is not limited to, polyester, nylon, fiberglass, polyethylene, polypropylene or other yarns and fabric constructions commonly found in industry. The core reinforcing fabric is preferably comprised of, but is not limited to, polyester yarn, polyamide yarn, polyimide yarn, polyethylene yarn, acrylic yarn, glass yarn, aramid yarn, cotton yarn and blends thereof.

The core reinforcing fabric preferably has a denier of 70 to 2000 denier. The reinforcing fabric preferably has 1-36 yarns per inch in the warp and fill directions, more preferably 6-18 yarns in the warp direction and 6-18 yarns in the fill direction.

Multi-Phase Adhesive System

The multiphase-adhesive layers (b) and (d) may be the same or different, and together they form a multiphase-adhesive system that attaches the thermoplastic layers to the core reinforcing layer (substrate). The formulation of the multiphase adhesive system is not particularly limited, so long as the formulation is converted into and integrated with the core reinforcing fabric during the manufacturing process to facilitate the formation of a highly dimensionally stable core support component. The formulation of the multi-phase adhesive system may be plastisol, aqueous, solvent or 100% solids based or a combination thereof. The multi-phase adhesive, which during the processing is converted into a continuous film by application of heat, is preferably engineered to achieve the optimum amount of interfacial adhesion, bonding and anchoring among and between the layers of the composite.

Other Additives

The embossed and texturized thermoplastic top layer, the embossed and texturized thermoplastic bottom layer and multi-phase adhesive layers may further other additives to impart desirable characteristics. These additives may comprise, but art not limited to, flame retardants, plasticizers, resins, fillers, inerts and other additives including biodegradable, bio-compostable and or non degradable or compostable additives and components to facilitate interfacial adhesion, bonding and anchoring of the various layers of the composite.

Each layer of the flexible thermoplastic reinforced composite may comprise a flame retardant additives such as antimony trioxide, brominated compounds, aluminum trihydrate, magnesium hydroxide, and the like to suppress the spread of an ignited flame as well as other additives, plasticizers, fillers and enhancers including but not limited to heat stabilized and lubricants to optimize the performance of the final product.

The embossed and texturized flexible thermoplastic composite may have a composition by weight of 20-80% thermoplastic film, 1-80% adhesive layer, 0-25% of flame retardant, 0-25% of stabilizers, 5-50% of core reinforcing fabric and 0-5% of antimicrobial and antifungal agents. With individual respect to the above components, the thermoplastic composite preferably contains from 1-25% of flame retardant, from 1-25% of stabilizers, and from 1-5% of antimicrobial and antifungal agents.

Embossing and Texturizing Fabric and System

As described above with reference to the drawing, the embossing and texturizing fabric is not a part of the final thermoplastic composite but, instead, is a part of the embossing and texturizing system that comprises a series of rolls and the embossing and texturizing fabric rolls. However, the embossing and texturizing fabric, its selection and alignment with other components of the above described embossing and texturizing system, and its alignment with the core reinforcing layer (typically, a fabric substrate), which does remain an integral part of the finished thermoplastic composite, achieves the desired natural cloth-like surface on both the top exterior surface and the bottom exterior surface.

The embossing and texturizing fabric is typically a reinforced fabric layer, preferably comprised of a polyester yarn, a polyamide yarn, a polyimide yarn, a polyethylene yarn, an acrylic yarn, a glass yarn, an aramid yarn, a cotton yarn, and blends thereof. The yarn may be selected to impart the desired degree of reinforcement, flexibility and stability.

The embossing and texturizing system on the face side preferably has 1-80 yarns per inch in the warp and fill directions, more preferably 30-80 yarns in the warp direction and 30-80 yarns in the fill direction. The embossing and texturizing system preferably has yarns of a denier ranging from 70 denier to 2000 denier in thickness in the warp direction. The embossing and texturizing system through the combination of the series of rolls and the embossing and texturizing fabric rolls imparts the appearance of a natural cloth-like fabric to one or both sides of the composite.

As described above, the invention is a significant, unique and novel improvement in the state of the art of synthetic multi-layer composite technology. The improved efficacy of the product and process methodology achieves results from the unique manner in which the synthetic multi-layer composites comprised of man-made textiles either woven, non-woven or knit and flexible thermoplastic materials are combined with a multi-phase adhesive system creating a highly desirable real cloth-like texture, feel, visual appearance and surface while imparting to the multilayer composite all the beneficial characteristics of synthetic polymer technology.

Additionally, the invention allows for the creation of this surface on both sides of the composite, a characteristic that is impossible to obtain through related methods and practices. That is, the embossed and texturized flexible thermoplastic composite of the present invention, wherein the embossed and texturized face and reverse surfaces are achieved by the alignment of the series of rolls and fabric embossing and texturizing rolls in relationship with the core reinforcing layer, has a natural cloth-like surface on each exterior side of the flexible thermoplastic composite that are identical in all practical manner.

The resulting invention has the appearance of highly desirable natural cloth-like fabric and the added benefit of being highly flame resistant, water-proof, mildew resistant, UV stable, color fast, strong, lightweight, conformable, cleanable, dimensionally stable and suitable for sewing, welding and fabrication by various means common in industry.

From the foregoing it is readily apparent that a flexible thermoplastic reinforced composite has been invented with the look and feel of cloth, together with the performance properties only achievable by certain thermoplastic composite materials and films. Thus, the embossed and texturized membrane has the visual and tactile feel of natural cloth and enhanced characteristics only found in thermoplastic. The resulting embossed and texturized thermoplastic composite can be fabricated using technology that is used for both cloth and thermoplastic materials, decorated with pressure sensitive lettering and is also receptive to digital printing.

While the invention has been described in detail and with reference to specific embodiments thereof, it will be apparent to one skilled in the art that various changes and modifications can be made therein without departing from the spirit and scope thereof.

What is claimed is:

1. An embossed and textured flexible thermoplastic composite, comprising:
   (a) a flexible thermoplastic top layer having an exterior face side and an interior reverse side,
   (b) a multi-phase adhesive layer,
   (c) a core reinforcing layer having a face and reverse side,
   (d) a multi-phase adhesive layer and
   (e) a flexible thermoplastic bottom layer having an exterior face side and an interior reverse side;
   wherein the exterior face side of the top layer and the exterior face side of the bottom layer have an embossed texture having a woven fabric pattern of 1-80 yarns per inch in the warp and fill directions and 70-2000 denier in thickness in the warp and fill directions.

2. The embossed and textured flexible thermoplastic composite according to claim 1, wherein the embossed texture of the exterior face side of the top layer is imparted by a first woven fabric having 1-80 yarns per inch in the warp and fill directions and 70-2000 denier in thickness in the warp and fill directions, and the embossed texture of the exterior face side of the bottom layer is imparted by a second woven fabric having 1-80 yarns per inch in the warp and fill directions and 70-2000 denier in thickness in the warp and fill directions.

3. The embossed and textured flexible thermoplastic composite according to claim 1, further comprising a top coat (f) on the exterior face side of the embossed and textured flexible thermoplastic top layer (a).

4. The embossed and textured flexible thermoplastic composite according to claim 3, wherein the top coat (f) comprises a polymer resistant to at least one of exposure to ultra violet light, weathering, staining, and plasticizer migration and degradation.

5. The embossed and textured flexible thermoplastic composite according to claim 1, wherein the adhesive layer (b) flows into and through the core reinforcement layer (c) and commingles with the adhesive layer (d) to form a core fabric adhesive system that provides dimensional stability and integrity.

6. The embossed and textured flexible thermoplastic composite according to claim 1, wherein the embossed and textured flexible thermoplastic exterior surfaces (a) and (e) have the appearance of natural cloth-like fabric.

7. The embossed and textured flexible thermoplastic composite according to claim 1, wherein the flexible thermoplastic top layer (a) comprises a material selected from the group consisting of polyvinyl chloride, polyurethane, polyester, polyamide, halogenated polyolefin, hydrogenated polyisoprene, hydrogenated polybutadiene, hydrogenated ethylene polybutadiene, hydrogenated styrene ethylene polybutadiene bloc copolymers, flexible grades of polyolefin, EVA, EVOH, thermoplastic block copolymers, polycaprolatones, polyacrylates and blends thereof.

8. The embossed and textured flexible thermoplastic composite according to claim 1, wherein the multi-phase adhesive layers (b) and (d), which may be the same or different, comprise a formulation that is plastisol, aqueous, solvent or 100% solids based or a combination thereof.

9. The embossed and textured flexible thermoplastic composite according to claim 3, wherein the polymer top coat (f) comprises a polymer selected from the group consisting of acrylic polymers, acrylic copolymers, acrylic terpolymers, methacrylic polymers, methacrylic copolymers, methacrylic terpolymers, acrylonitrile polymers, acrylonitrile copolymers, acrylonitrile terpolymers, fluorinated polymers, fluorinated copolymers, fluorinated terpolymers, chlorofluoro polymers, chlorofluoro copolymers, chlorofluoro terpolymers, polyamide polymers, polyamide copolymers, polyamide terpolymers, aliphatic polymers, aliphatic copolymers, aliphatic terpolymers, urethane polymers, urethane copolymers, urethane terpolymers and blends thereof.

10. The embossed and texturized thermoplastic composite according to claim 1, wherein the face side of one or both of the flexible thermoplastic top layer (a) and the flexible thermoplastic bottom layer (e) are top coated with a polymer comprising one or more of bio-degradable, biocompostable and non degradable, non compostable additives and components.

11. The embossed and textured flexible thermoplastic composite according to claim 10, wherein the top coat further comprises an agent provided to impart, enhance and further customize the surface finish.

12. The embossed and textured flexible thermoplastic composite according to claim 1, wherein the core reinforcing layer comprises a reinforcing fabric selected from the group consisting of polyester, nylon, fiberglass, polyethylene, polypropylene and blends thereof.

13. The embossed and textured flexible thermoplastic composite according to claim 12, wherein the reinforcing fabric has a denier of 70 to 2000 denier.

14. The embossed and textured flexible thermoplastic composite according to claim 1, wherein one or more of the thermoplastic top layer, the thermoplastic bottom layer and the multi-phase adhesive layers comprise one or more additives selected from the group consisting of flame retardants, plasticizers, resins, fillers, inerts, biodegradable, bio-compostable and or non degradable or compostable additives and components to facilitate interfacial adhesion, bonding and anchoring of the various layers of the composite.

15. The embossed and textured flexible thermoplastic composite according to claim 1, wherein the embossed and texturized flexible thermoplastic composite comprises from 20-80% thermoplastic film, 1-80% adhesive layer, 0-25% of a flame retardant, 0-25% of stabilizers, 5-50% of a reinforcing fabric in the core reinforcing layer and 0-5% of antimicrobial and antifungal agents.

16. The embossed and textured flexible thermoplastic composite according to claim 14, wherein the flame retardant comprises one or more compounds selected from the group consisting of antimony trioxide, a brominates compound, aluminum trihydrate and magnesium hydroxide.

17. The embossed and textured flexible thermoplastic composite according to claim 1, wherein the core reinforcing layer comprises a reinforcing fabric that has 1-36 yarns per inch in the warp and fill directions.

18. The embossed and textured flexible thermoplastic composite according to claim 2, wherein the first woven fabric has 30-80 yarns per inch in the warp and fill directions, and the second woven fabric has 30-80 yarns per inch in the warp and fill directions.

19. The embossed and textured flexible thermoplastic composite according to claim 17, wherein the reinforcing fabric has 6-18 yarns in the warp direction and 6-18 yarns in the fill direction.

20. The embossed and textured flexible thermoplastic composite according to claim 1, wherein the core reinforcing layer comprises a reinforcing fabric selected from polyester yarn, polyamide yarn, polyimide yarn, polyethylene yarn, acrylic yarn, glass yarn, aramid yarn, cotton yarn and blends thereof.

21. The embossed and textured flexible thermoplastic composite according to claim 1, further comprising a top coat (g) on the exterior face side of the flexible thermoplastic bottom layer (e).

22. The embossed and textured flexible thermoplastic composite according to claim 21, wherein the top coat (g) comprises a polymer resistant to at least one of exposure to ultra violet light, weathering, staining, and plasticizer migration and degradation.

23. The embossed and textured flexible thermoplastic composite according to claim 21, wherein the top coat (g) comprises a polymer selected from the group consisting of acrylic polymers, acrylic copolymers, acrylic terpolymers, methacrylic polymers, methacrylic copolymers, methacrylic terpolymers, acrylonitrile polymers, acrylonitrile copolymers, acrylonitrile terpolymers, fluorinated polymers, fluorinated copolymers, fluorinated terpolymers, chlorofluoro polymers, chlorofluoro copolymers, chlorofluoro terpolymers, polyamide polymers, polyamide copolymers, polyamide terpolymers, aliphatic polymers, aliphatic copolymers, aliphatic terpolymers, urethane polymers, urethane copolymers, urethane terpolymers and blends thereof.

24. The embossed and textured flexible thermoplastic composite according to claim 2, wherein a series of rolls selected from the group consisting of metal rolls, rubber rolls, and a combination thereof are used in combination with the first and second woven fabrics to impart the embossed textures of the exterior face side of the top layer and the exterior face side of the bottom layer.

25. The embossed and textured flexible thermoplastic composite according to claim 8, wherein the multi-phase adhesive layers (b) and (d) are converted into and integrated with the core reinforcing layer to provide a dimensionally stable core support component.

26. The embossed and textured flexible thermoplastic composite according to claim 1, wherein the reverse side of the top layer (a) is adhered, bonded and anchored to the core reinforcing layer (c) by means of the multi-phase adhesive layer (b), and the reverse side of the bottom layer (e) is adhered, bonded and anchored to the (c) core reinforcing layer by means of the multi-phase adhesive layer (d).

27. A method of making the embossed and textured flexible thermoplastic composite according to claim 1, comprising:
providing a flexible thermoplastic composite comprising, in this order, a flexible thermoplastic top layer having an exterior face side and an interior reverse side, a core reinforcing layer, and a flexible thermoplastic bottom layer having an exterior face side and an interior reverse side;
contacting the exterior face side of the top layer with a first woven fabric to impart the embossed texture to the top layer; and
contacting the exterior face side of the bottom layer with a second woven fabric to impart the embossed texture to the bottom layer.

28. The method according to claim 27, wherein the embossed textures of the top layer and the bottom layer are simultaneously imparted by the first and second woven fabrics.

29. The method according to claim 27, wherein the first woven fabric has 1-80 yarns per inch in the warp and fill directions and 70-2000 denier in thickness in the warp and fill directions, and the second woven fabric has 1-80 yarns per inch in the warp and fill directions and 70-2000 denier in thickness in the warp and fill directions.

30. The method according to claim 27, wherein the embossed textures of both the top layer and the bottom layer are simultaneously imparted by using rolls in combination with the first and second woven fabrics, the rolls respectively pressing the first and second woven fabrics into the exterior face side of the top and bottom layers.

31. The embossed and textured flexible thermoplastic composite according to claim 1, wherein the exterior face side of the top layer and the exterior face side of the bottom layer have an embossed texture having a woven fabric pattern of 30-80 yarns per inch in the warp and fill directions.

32. The embossed and textured flexible thermoplastic composite according to claim 1, wherein the composite has a thickness of 50 mils or less.

33. The embossed and texturized flexible thermoplastic composite according to claim 1, wherein the embossed texture of the exterior face side of the top layer is substantially identical to the embossed texture of the exterior face side of the bottom layer.

34. The embossed and textured flexible thermoplastic composite according to claim 1, wherein the exterior face side of the top layer and the exterior face side of the bottom layer have an embossed texture having a woven fabric pattern of 20-80 yarns per inch in the warp and fill directions.

35. The embossed and texturized flexible thermoplastic composite according to claim 34, wherein the embossed texture of the exterior face side of the top layer is substantially identical to the embossed texture of the exterior face side of the bottom layer.

36. The embossed and texturized flexible thermoplastic composite according to claim 31, wherein the embossed texture of the exterior face side of the top layer is substantially identical to the embossed texture of the exterior face side of the bottom layer.

* * * * *